April 14, 1970   G. SCHRADER   3,505,930
PISTON ARRANGEMENT FOR THE MASTER CYLINDER OF A VEHICLE BRAKE
Filed Feb. 2, 1968
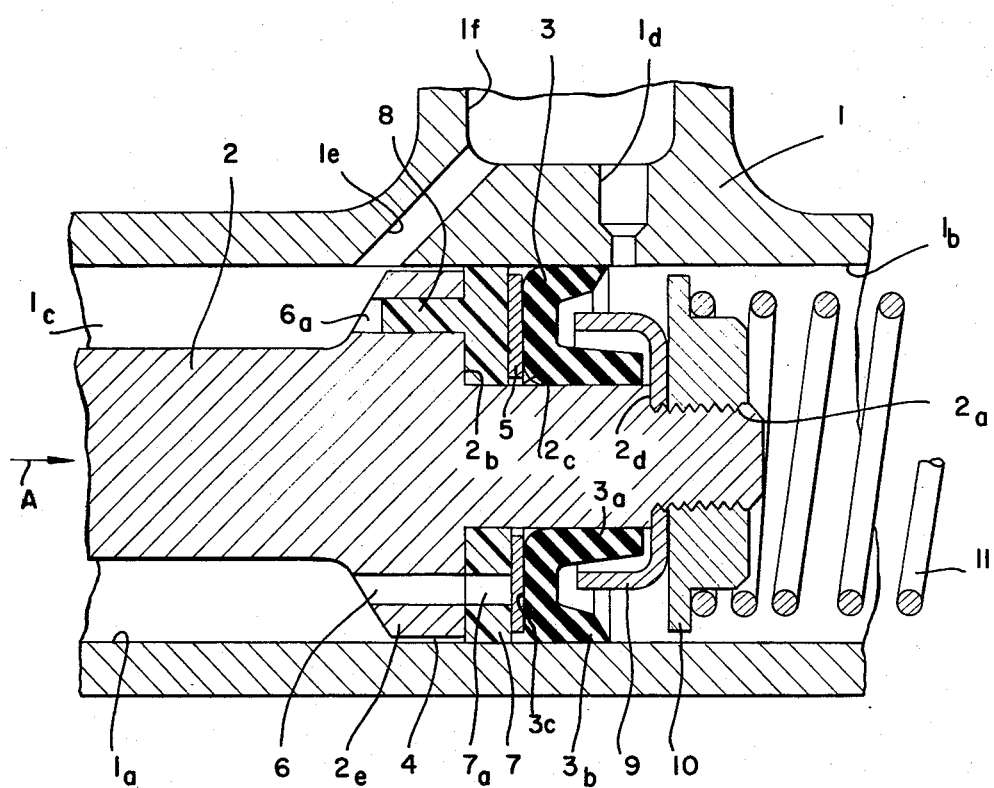
GERT SCHRADER
INVENTOR.
BY Karl F. Ross
Attorney 3,505,930
PISTON ARRANGEMENT FOR THE MASTER
CYLINDER OF A VEHICLE BRAKE
Gert Schrader, Walldorf, Germany, assignor to Alfred
Teves G.m.b.H., Frankfurt am Main, Germany, a corporation of Germany
Filed Feb. 2, 1968, Ser. No. 702,595
Claims priority, application Germany, Feb. 3, 1967,
T 33,142
Int. Cl. F16j 9/00
U.S. Cl. 92—240                              9 Claims

ABSTRACT OF THE DISCLOSURE

A master-cylinder piston assembly for vehicle brake systems and other hydraulic installations, especially installations operating at elevated pressures, the piston having a so-called "primary" cup and, between the face of the piston and the rear surface of the primary cup or the disk abutting same, a disk of polytetrafluorethylene of substantially the full diameter of the cylinder bore and sealingly engaging the walls thereof; an axial projection of this sealing disk is received in an axial bore of the piston to prevent rotation of the disk which has a port registering with the bypass bore of the piston.

---

My present invention relates to a piston construction for the control cylinder of a hydraulic installation and, more particularly, to master cylinders of automotive hydraulic-brake installations operating at relatively elevated pressures.

It is common practice in servocontrol systems in which a hydraulic medium serves as the transmitting means to provide a so-called "master cylinder" in which the movement of a piston is transformed into displacement of the hydraulic fluid and, in accordance with Pascal's law, displaces a slave or follower piston to perform some desired function. Devices of this type are commonly used as servomechanisms, for control of massive members and as transmission systems for force or the like where direct mechanical linkages would be inconvenient. A typical use of a master cylinder of this nature is in an automotive-vehicle hydraulic-brake installation. Such installations frequently comprises a single-compartment or dual-compartment (tandam or twin) master cylinder surmounted by a brake-fluid reservoir and receiving one or two master pistons which are actuated directly or indirectly by the brake pedal of the vehicle. In direct-actuating units, the brake pedal is mechanically coupled with the piston via a pivot link or the like. In indirect actuation systems, a power-assist cylinder, operated by hydraulic or gas-pressure differential, may be interposed between the brake pedal and the master piston to displace the latter with substantially higher force than is possible with the brake pedal alone. The fluid compartment of the master cylinder is connected by a hydraulic transmission network with the wheel brakes of the vehicle. The wheel brakes may be of the disk-type wherein each wheel is rotatable with a disk whose annular braking faces lie in planes transverse to the axis of rotation and co-operate with a brake yoke extending around the periphery of the disk, which may be connected to a nonrotatable portion of the vehicle. The brake yoke is formed with the wheel-brake cylinders which apply the brakeshoes axially against the disk. In internal-expansion brakes, the rotating brake surface is a drum coupled with the vehicle wheel and engaged by segmental brakeshoes which are shifted radially against the drum by the wheel-brake cylinder.

In master cylinders for vehicle brakes and other purposes, it is common practice to provide at the forward end of the master cylinder, i.e. the end of this piston in the direction of its movement during brake actuation, a so-called primary sealing cup concave in the direction of the working chamber and with a lip slidably engageable with the wall of the cylinder. This cup forms a valve member which closes first the port connecting the interior of the master cylinder with the supply tank. At the rear end of the piston, i.e. the end through which the link applies the brake-pedal force, the secondary cup is provided to prevent leakage from the cylinder bore. An advantage of the primary cup described above is that, with increase in the pressure within the working chamber, the lip of the primary cup is forced outwardly with increased pressure to improve the sealing action. However, during the pressure stroke, the bottom or rearward surface of the primary cup is forced against the forward face of the piston. It has been found that, especially with the high-pressure brakes, the pressure applied to the primary cup often suffices to extrude the soft rubber of the cup into the narrow gap between the piston and the cylinder walls and into any openings of the piston. Openings are commonly required to form bypass ports in the piston which lead fluid into the working chamber from the compartment surrounding the piston when a pressure imbalance exists across the cup. Because of this extrusion of the cup material, the frictional action upon the extruded portion and the cutting action at the edge of the piston, the primary cups of conventional brake structures frequently are destroyed in whole or in part, even though a nonperforated backing plate of metal is usually disposed between the primary cup and the front face of the piston. It will be appreciated that, when such a backing plate is dimensioned so that it does not engage the cylinder wall, the extrusion gap mentioned earlier now forms between the plate and the wall of the cylinder although, of course, no extrusion through the bypass passages in the piston occurs. A disadvantage also arises when the backing disk is equal to the diameter of the cylinder bore, namely, the tendency toward binding and possible damage to the wall.

It is, therefore, the principal object of the present invention to provide an improved master-cylinder assembly for high-pressure automotive brakes and other hydraulic installations.

I have found that the disadvantages of earlier master-cylinder arrangements, as described above, can be obviated by providing between the primary cup and the forward face of the piston turned toward the working chamber of the master cylinder a disk of relatively low-friction, wear-resistant synthetic resin which is less extrudable than the rubber cup and engages the cylinder wall so as to prevent the extrusion of the cup material into any crevice along the periphery of this backing disk. According to a more specific feature of my invention, this backing disk is composed of polytetrafluoroethylene (Teflon) and is mounted, in the form of a ring, upon the axial boss of the piston which serves to position the cup and the seat for the return spring.

I having found, moreover, that it is advantageous to locate this polytetrafluoroethylene disk between the solid backing disk, usually composed of metal, which is commonly interposed between the forward face of the piston and the soft rubber primary cup. Furthermore, when the piston is provided with bypass bores connecting the annular chamber surrounding the piston with the working chamber, I have found it desirable to form the Teflon disk with at least one bore aligned with the bypass passage while means is provided to prevent rotation of the Teflon disk. Such means can be an axially extending projection formed unitarily and integrally on the Teflon disk.

The above and other objects, features and advantages of the present invention will become more readily apparent from the following description, reference being made to the accompanying drawing, the sole figure of which is an axial cross-sectional view through a portion of a master cylinder in accordance with this invention.

It will be apparent from the foregoing that the present invention relates to a master cylinder primary-cup construction for the master cylinder of a vehicle hydraulic brake or a master hydraulic cylinder or any other installation. In the subsequent description, only the pertinent parts of the assembly will be described, the balance of the master hydraulic brake cylinder being of any conventional construction, e.g. as described in Principles of Automotive Vehicles, U.S. Government Printing Office, Washington D.C., 1956, pages 437ff.

In the drawing, the master-cylinder housing is shown at 1 to have a cylinder bore 1a in which a piston 2 is axially shiftable, this piston forming a working compartment 1b which is connected with the wheel brakes and a compartment 1c surrounding the piston. The direction of piston movement for brake actuation is represented by the arrow A.

The piston 2, which is axially shiftable against the return spring 11 which bears against a spring seat 10, threaded onto a stub 2a extending forwardly of the front face 2b of piston 2, carries a boss 2c whose shoulder 2d retains a gap 9 concave in the direction of the boss 2c to protect the inner sleeve portion 3a of a soft-rubber primary cup 3 carried on this boss 2c. The sleeve 3a hugs the boss 2c while the cup 3 is concave in the direction of piston displacement for brake actuation (arrow A); the cup 3 also has a lip 3b which is radially deflectable outwardly under fluid pressure so that, during the forward movement of the piston 2, in its compression stroke, the cup 3 seals the annular gap 4 between the piston head 2e and the wall of bore 1a.

In addition, during this forward stroke, the lip 3b of the primary cup closes off the bypass port 1d which, with the intake port 1e, connects the bore 1a with the supply tank or brake-fluid reservoir 1f. The annular gap 4 is a consequence of the finishing tolerances of the cylinder wall and the piston head, the characteristics of the materials from which they are made and the result of sliding movement of the piston, i.e. the metal-to-metal contact of piston and cylinder wall.

During the return stroke, pressure equalization is permitted between the chambers 1b and 1c (when the piston 2 is drawn in the left-hand direction) to permit brake fluid in compartment 1c to deflect the lip 3b inwardly and thereby allow the fluid to flow through the head 2c past the cup 3b. Between the rear face 3c of the cup 3 and the forward face 2b of piston 2, there is provided, in the usual manner, a non-perforated backing disk 5 designed to block the passage 6 in the head 2e of the piston and to prevent extrusion of the material of the cup 3 through the bores 6 under the pressure in chamber 1b.

To avoid possible extrusion of the cup between the cylinder wall and the outer periphery of disk 5 or into the gap 4, I provide a polytetrafluoroethylene disk 7 (of Teflon) which has an outer diameter equal to the inner diameter of the cylinder bore 1a and thus engages the latter. In line with the bypass port 6, I provide a bore 7a whose angular position of alignment with passage 6 is maintained by a projection 8 integrally formed with the disk 7 and received in a similar bore 6a diametrically opposite the bore 6. Thus, rotation of the disk 7 about the boss 2c is prevented. The disk 5 may be bonded by vulcanization or cementing to the primary cup 3.

I claim:

1. In a pressure-transmitting cylinder for displacing a hydraulic fluid, the improvement which comprises a piston axially shiftable in said cylinder and defining a working compartment sustaining an increased pressure upon movement of said piston in one direction, said piston having a forward face turned toward said compartment at a corresponding end of the piston, a sealing cup mounted on said end of said piston and concave in said direction while having an annular lip engageable with an inner wall of said cylinder for sealing said compartment, said cup having a rearward face turned toward said forward face, and a disk of polytetrafluoroethylene disposed between said faces and preventing extrusion of the material of said cup between said piston and said wall, said rearward face of said cup being formed with a nonperforated backing plate, said piston being formed with an axially extending boss projecting forwardly from said end and having a shoulder spaced ahead of said forward face, said cylinder being provided with a return spring urging said piston in the opposite axial direction, and a seat for said spring acting against said shoulder, said cup being annular and having a sleeve portion hugging said boss between said disk and said seat.

2. The improvement defined in claim 1 wherein said end of said piston is formed with a bypass passage adapted to communicate with said compartment to equalize pressures on opposite sides of said cup, said disk being provided with a bore registering with said passage.

3. The improvement defined in claim 2 wherein said cylinder and said piston are cylindrical, further comprising means for preventing relative rotation of said piston and said disk.

4. The improvement defined in claim 1 wherein said disk sealingly engages the wall of said cylinder.

5. The improvement defined in claim 1 wherein said disk is annular and is seated upon said boss.

6. The improvement defined in claim 5 wherein said cylinder is a master hydraulic cylinder for an automotive-vehicle brake system.

7. In a pressure-transmitting cylinder for displacing a hydraulic fluid, the improvement which compromises a piston axially shiftable in said cylinder and defining a working compartment sustaining an increased pressure upon movement of said piston in one direction, said piston having a forward face turned toward said compartment at a corresponding end of the piston, a sealing cup mounted on said end of said piston and concave in said direction while having an annular lip engageable with an inner wall of said cylinder for sealing said compartment, said cup having a rearward face turned toward said forward face, a disk of polytetrafluoroethylene disposed between said faces and preventing extrusion of the material of said cup between said piston and said wall, said end of said piston being formed with a bypass passage adapted to communicate with said compartment to equalize pressures on opposite sides of said cup, said disk being provided with a bore registering with said passage, said cylinder and said piston being cylindrical, means for preventing relative rotation of said piston and said disk, said means including an axially extending bore formed in said piston at its forward face, and an axially extending projection unitarily mounted on said disk and received in the bore of said piston.

8. The improvement defined in claim 7 wherein said rearward face of said cup is formed with a nonperforated backing plate.

9. The improvement defined in claim 7 wherein said disk sealingly engages the wall of said cylinder.

References Cited

UNITED STATES PATENTS

| 2,836,474 | 5/1958 | Mosher | 92—240 |
| 2,985,358 | 5/1961 | Lee et al. | 92—240 X |
| 3,103,787 | 9/1963 | Reynolds | 92—240 X |
| 3,131,611 | 5/1964 | McLaughlin | 92—244 |

FOREIGN PATENTS

| 1,139,063 | 2/1957 | France. |
| 510,002 | 10/1930 | Germany. |

CARROLL B. DORITY, Jr., Primary Examiner